United States Patent [19]

Sanders et al.

[11] Patent Number: 4,861,962
[45] Date of Patent: Aug. 29, 1989

[54] NOZZLE SHIELD FOR A PLASMA ARC TORCH

[75] Inventors: Nicholas A. Sanders, Norwich, Vt.; Richard W. Couch, Jr., Hanover, N.H.

[73] Assignee: Hypertherm, Inc., Hanover, N.H.

[21] Appl. No.: 203,440

[22] Filed: Jun. 7, 1988

[51] Int. Cl.⁴ .............................................. B23K 9/00
[52] U.S. Cl. .................................. 219/121.5; 219/75; 219/121.51; 219/121.52
[58] Field of Search ...................... 219/121.39, 121.48, 219/121.49, 121.5, 121.51, 121.52, 74, 75; 313/231.31, 231.41, 231.51

[56] References Cited

U.S. PATENT DOCUMENTS

| | | | |
|---|---|---|---|
| 3,272,962 | 9/1966 | Mauskapf | 219/121.48 |
| 3,641,308 | 2/1972 | Couch, Jr. et al. | 219/121.5 |
| 4,389,559 | 6/1983 | Rotolico et al. | 219/121.5 |
| 4,421,970 | 12/1983 | Couch, Jr. | 219/121.5 |
| 4,521,666 | 6/1985 | Severance, Jr. et al. | 219/121.5 |
| 4,762,977 | 8/1988 | Browning | 219/121.52 |

*Primary Examiner*—M. H. Paschall
*Attorney, Agent, or Firm*—Wolf, Greenfield & Sacks

[57] ABSTRACT

A plasma arc cutting torch, particularly one operating in the 0-200 ampere range, has a shield mounted at its lower end adjacent a workpiece to block splattered molten metal from reaching a nozzle of the torch. The shield is electrically insulated, preferably by mounting it on an insulating ring that is itself secured on a cap screwed onto the torch body. A secondary gas flow through the torch passes through the space between the nozzle and the shield to provide cooling. Bleed ports in the shield allow an enhanced flow rate with the remaining flow being at a rate, in conjunction with the size of an exit orifice in the shield, to stabilize the plasma arc. Canted ports in the secondary gas flow path produce a swirling of the gas flow which enhances the quality of the cut.

17 Claims, 4 Drawing Sheets

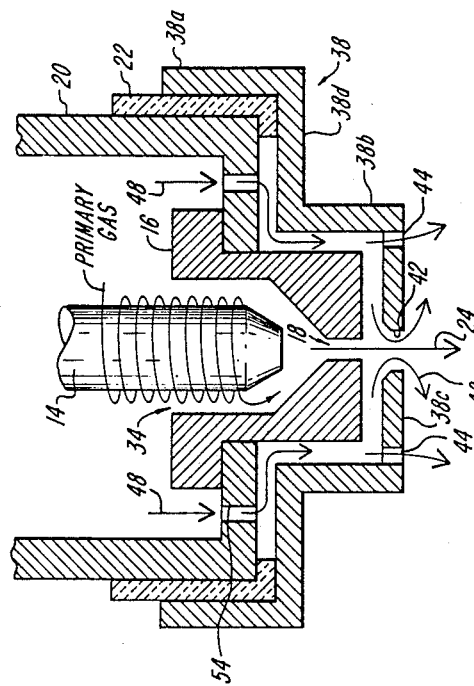
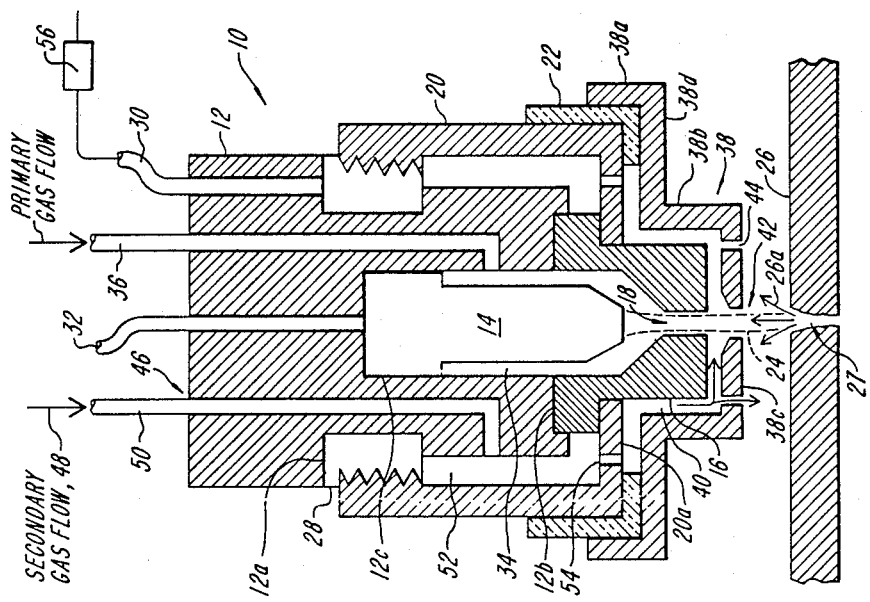
FIG. 3B
FIG. 3A

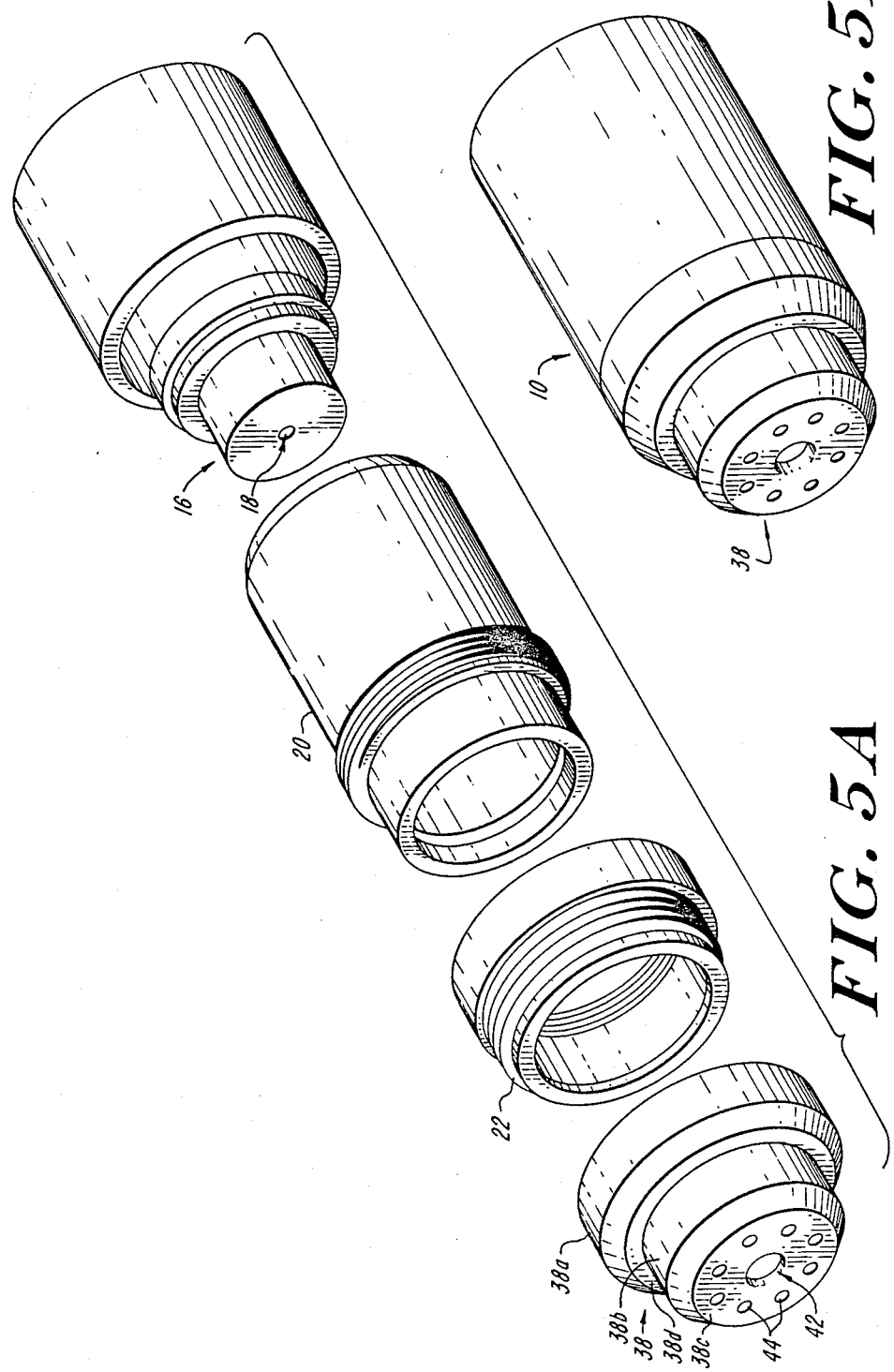

NOZZLE SHIELD FOR A PLASMA ARC TORCH

BACKGROUND OF THE INVENTION

This invention relates to plasma arc cutting torches. More specifically, it relates to a plasma arc cutting torch and method that protect the nozzle from gouging and double arcing during the cutting of metal workpieces.

Basic components of modern plasma arc torches include a torch body, an electrode (cathode) mounted within the body, a nozzle (anode) with a central orifice that produces a pilot arc to the electrode to initiate a plasma arc in a flow of a suitable gas, typically nitrogen, and associated electrical connections, passages for cooling, and arc control fluids, and typically a ceramic insert mounted at the face of the torch immediately adjacent the workpiece.

Various plasma arc torches are known which control the flow dynamics of the fluids producing the plasma. One of the present applicants, for example, is the patentee of U.S. Pat. No. 3,641,308 which uses a flow of a cooling water developed in the nozzle of the torch to constrict the plasma arc to produce a better quality cut. Any torch must also provide cooling since the plasma arc produces temperatures in excess of 10,000° C. which, if not controlled, could destroy the nozzle. Water cooling has hertofore been preferred because the heat transfer ability of water is much greater than that of any gas, and water is a readily available, inexpensive liquid. In piercing metal, however, another important design consideration is the ejection of molten metal from the cut kerf back onto the torch which can destroy the nozzle. There are two principal modes for this destruction. First, molten metal ejected from the cut kerf can disturb the plasma jet causing it to gouge the nozzle. Second, the molten metal can solidify and adhere to the front face of the nozzle which eventually causes an electrical bridging between the nozzle and the workpiece. This results in "double arcing" which can drastically reduce the life of a nozzle.

There have been several approaches to solving the gouging and double arcing problems created by the ejection of molten metal. In high current plasma cutting torches (200 amperes and more), the solution has been to use a multi-piece nozzle with water injection cooling. A typical such nozzle of the type manufactured by Hypertherm, Inc. is illustrated in a simplified schematic form in FIGS. 1a and 1b. In FIG. 1a, corresponding to Hypertherm Models HT400 0.099, HT400 0.166 and PAC500 0.187, the front face of the nozzle is made of a ceramic. This arrangement controls gouging and double arcing because (1) the ceramic nozzle face is non-conducting and therefore will not cause double arcing and (2) the nozzle is protected by the ceramic barrier. Further the excellent cooling properties of the water, operating by cooling the ceramic nozzle piece and by water vapor cooling the molten metal ejected during piercing, inhibit the molten metal from boding or fusing to the ceramic element or, in the extreme case, from attacking the ceramic. FIG. 1b shows a variation on the high-current, multi-component nozzle similar to the nozzle sold by Hypertherm as its Model PAC500 0.250. Again, the key to the solution is radial water injection, but the ceramic nozzle piece is replaced by a copper front piece. An insulating element separates the nozzle components so that the front of the nozzle is floating electrically. The copper is more readily cooled than the ceramic and it withstands abuse significantly better, and therefore has a longer life.

At low current operation, 0–200 amperes, water injection becomes less practical. Aside from the obvious additional costs of the water cooling system and fabricating a multi-part nozzle, at these lower power levels water cooling draws too much energy from the plasma. However, the problem of high nozzle wear due to piercing remains. Heretofore the only commercially viable solution known to applicants has been to use a single piece copper nozzle, take no measures to protect it against splattered molten metal, and to restrict operation to currents below 150 amperes. The nozzle is sometimes gas cooled, and the gas can serve as a cover gas, but there is no piercing protection for the nozzle. Molten metal can, and does, deflect the plasma arc so that it gouges the nozzle and can, and does, build up on the nozzle face causing double arcing. Because this nozzle is comparatively inexpensive to fabricate, industry practice is to accept nozzle destruction and to replace the nozzle periodically. A typical life for a nozzle of this type, operating at 40–50 amperes, is about 1 hour of operation when used to pierce ¼ inch mild steel.

FIG. 2a shows, in simplified schematic form, a typical one-piece, low-current nozzle of this type. As shown, a cooling gas flow is typically along the outer surface of the nozzle toward the workpiece. Nozzles of this type are sold by Hypertherm, Inc. as its Model Nos. HT40 0.038 and MAX100 0.059. There have been attempts to protect low-current, single piece nozzles. One attempt is shown in FIG. 2b. A ceramic insulating sleeve is attached to the outside of the nozzle. This is a so-called "shield cup". It's main purpose is to stop nozzle-to-workpiece contact. An operator can then touch or drag the torch on the workpiece without double arcing. This ceramic sleeve, however, offers no protection during piercing against molten metal splatter and the attendant gouging and double arcing problems. Also, the ceramic shield (1) is brittle and breaks easily and (2) not having the protection of water cooling, is attacked by the molten metal ejected from the cut.

While replacement of one-piece nozzles may be acceptable the 0–50 ampere range, at the 50–200 ampere range the molten metal damage to the nozzle occurs so quickly that nozzle replacement is economically undesirable. The problem is worse with increased currents, so that, commercial plasma arc cutting torches using single piece nozzles are not yet available to operate above 150 amperes.

It is therefore a principal object of this invention to provide a plasma arc cutting torch and method that protects the torch nozzle from gouging and double arcing, without using water cooling while operating at current levels from 0–200 amperes, or even higher.

Another object of this invention is to provide a plasma arc torch and method with the foregoing advantages that is highly durable and provides a nozzle life comparable to that obtained with torches using injection water cooling and multi-piece nozzles.

A further object of the present invention is to provide the foregoing advantages with a single piece nozzle.

A still further object of this invention is to provide the foregoing advantages and produce a good quality cut kerf in the workpiece.

Another object of the present invention is to provide the foregoing advantages using replaceable components and standard materials that can be adapted to retrofit existing plasma arc torches which have no piercing protection.

SUMMARY OF THE INVENTION

A plasma arc cutting torch has a body, an electrode mounted within the body, and a nozzle mounted on the body at a lower end of the torch adjacent a workpiece to be cut. A space between the electrode and the nozzle defines part of a primary gas flow path for gas that is ionized to produce a plasma arc. The body has internal passages to supply the primary gas, and the nozzle has an outlet orifice from which the plasma arc exits the torch once the arc transfers to the workpiece for piercing. The torch also includes conductors which introduce a direct current, typically in the range of 0-200 amperes, to the electrode-nozzle pair.

A cup-like shield formed of a material with a large thermal conductivity, preferably copper, is mounted on the lower end of the torch to substantially enclose the nozzle, in a spaced relationship, except for (i) a central exit orifice that is generally aligned with the nozzle orifice and (ii) at least one and preferably plural bleed holes equiangularly spaced around the exit orifice and lying in the front face of the shield immediately opposite the workpiece. A mounting ring formed of a dielectric material supports the shield and insulates it electrically from the body so that the shield is electrically "floating". A secondary gas flow path through the torch body directs a flow of cooling gas to the space between the nozzle and the shield. Preferably the secondary flow first enters a plenum formed in the body by a cap threaded onto the body which in turn supports the dielectric mounting ring. The plenum feeds the cooling gas through a set of canted ports formed in a flange of the cap swirl the secondary gas flow. A portion of the swirling flow exits the torch via the bleed holes formed in the front face of the shield. The remaining gas flow is directed to and stabilizes the plasma arc. The flow cools the front face of the shield. The number and dimensions of the bleed holes, the exit orifice diameter, the shield-nozzle spacing and the secondary gas flow rate are correlated empirically for each application to produce the aforementioned stabilization and a sufficient cooling of the shield to resist the adherence or fusion of molten metal on the shield. The upper edge of the shield at the exit orifice is preferably rounded to facilitate the smooth merging and exit from the torch of the reaming cooling gas flow and the plasma arc (the ionized primary gas flow).

With this structure, a gas flow has been found to be sufficient to cool the shield sufficiently to prevent its destruction by the molten metal or the plasma itself despite the fact that the specific heat of the gas is many times smaller than that of cooling liquids, especially water. The flow has also been found to significantly improve the quality of the cut made by the torch. The bleed ports and exit orifice are relatively small openings so that the shield blocks substantially all of the molten metal that would otherwise quickly destroy the nozzle.

Stated as a process and in its broadest form, the present invention involves the steps of blocking the molten metal ejected from the cut from reaching the nozzle using a shield, and cooling the shield with a secondary gas flow. The process also includes bleeding off a portion of the flow to enhance the total flow rate and swirling the flow at a sufficient velocity and mass flow rate to provide a cut of good quality.

These and other features and objects of the present invention will be more fully understood from the following detailed description which should be read in light of the accompanying drawings.

BRIEF DESCRIPTION OF THE DRAWINGS

FIG. 3a is a simplified view in cross section of a plasma arc cutting torch according to the present invention;

FIG. 3b is a detailed view of the nozzle, cap, shield and gas flow paths of the plasma arc torch shown in FIG. 3a;

FIG. 5A is an exploded perspective view of the torch shown in FIG. 4;

FIG. 5B is a perspective view of the torch shown in FIGS. 4 and 5A;

DETAILED DESCRIPTION OF THE PREFERRED EMBODIMENTS

Figure 7:
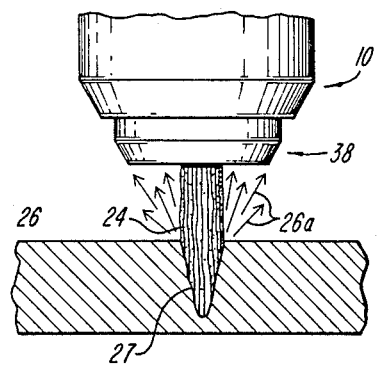
FIG. 7 is a simplified view in side elevation and partially in section showing the plasma arc torch of FIGS. 3a-6 piercing a workpiece.
Figure 8:
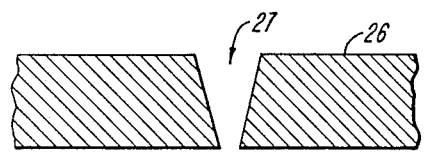
FIG. 8 is a view in vertical section of the cut kerf in the workpiece shown in FIG. 7 after piercing.

FIGS. 3a and 3b show in simplified form a plasma arc torch 10 constructed according to the present invention. The torch 10 has a body 12, and electrode 14, a nozzle 16 with a nozzle orifice 18, a cap 20 threaded onto the body and an insulating ring 22 threaded or otherwise secured on the cap. As is also shown in FIGS. 7 and 8, a plasma arc 24 impinges on a workpiece 26, e.g. a thick sheet of mild steel where it pierces the metal creating a cut kerf 27. Molten metal at the site of the piercing initially is ejected laterally, but as the cut becomes deeper into the workpiece, molten metal 26a is ejected more vertically so that it is directed back towards the nozzle 16.

As shown, the body 12 is a generally solid, cylindrical single piece with various internal passages and recesses to provide the necessary fluid flow passages and electrical connections, whether alone or in cooperation with other components. However, the body can be formed of multiple pieces with any of a wide variety of configurations provided that they provide the necessary support functions and form the necessary internal passages. In the preferred form shown, a current ring 28 is secured to the outer surface of the body 12 in a circumferential recess 12a. The current ring is formed of a material that has good electrical conductivity properties, such as brass, and is in electrical connection with a pilot arc lead 30 which passes through the upper end (as shown) of the body 12. The cap 20 is also formed of a good conductor, such as copper or brass, and closes a pilot arc circuit to the nozzle 16 which is clamped in place, replaceably, between a cap flange 20a and a circular recess 12b formed on the lower end of the body 12. The recess 12b and cap 20 also align the nozzle radially within the torch. The body also has a central bore 12c that holds the electrode 14 replaceably in electrical connection with a current lead 32 that also passes through the upper end of the body 12. The recess 12b also aligns the electrode so that it is generally uniformly spaced from the interior surface of the nozzle to define therebetween a plasma chamber 34. A gas tube 36 passes through the body 12 to direct a primary flow of a conventional gas, such as nitrogen, to the chamber where it is ionized and forms plasma arc 24 exiting the nozzle orifice 18.

A principal feature of the present invention is a nozzle shield 38 threaded at its upper side wall 38a to the insulating ring 22. In the simplified form shown in FIGS. 3a and 3b, the shield has a stepped cup-like configuration including a lower, generally cylindrical side wall 38b, a front face 38c, and a recessed front face 38d that spans and connects the side walls 38a and 38b. The shield is preferably machined as an integral component from a metal with a high thermal conductivity. Copper is preferred. The shield 38 is configured so that it is spaced from the cap flange 20a and the nozzle to define a gas flow passage 40. The front face 38c of the shield has an exit orifice 42 aligned with the nozzle orifice 18 to provide a clear exit path for the plasma arc. It also includes a set of generally equiangularly spaced holes 44 spaced radially from the exit orifice.

Another principal feature of the present invention is a secondary gas flow path 46 which directs a flow 48 of a cooling gas, such as nitrogen, from a supply tube 50 passing through the body 12 to a plenum chamber 52 (defined by the cap, the opposite outer wall of the torch body, and the clamped portion of the nozzle) and then through a set of ports 54 found in the cap flange 20a to the space 40. The plenum chamber 52 provides a local reservoir of gas that isolates the flow through the space 40 from transient fluctuations in the gas pressure or flow rate in the supply tube 50. The ports 54 are preferably equiangularly spaced and sized to produce a sufficient gas flow rate through the space 40 to cool the shield 38 to a degree that inhibits the adherence of ejected molten metal. The ports are also angled circumferentially to induce a swirling otion in the gas flow 48 through the passage 40. This swirling has been found to be significantly related to the quality of the cut kerf produced in the workpiece by the plasma arc. The holes 44 bleed off a portion of the gas flow 48 to allow an enhanced flow rate, and therefore increased cooling. The remaining gas flow 48a which swirls inwardly from the bleed holes 44 to the exit orifice 42 (1) cools the front face 38c and (2) stabilizes the plasma arc, that is, it assists in controlling the location and diameter of the arc so that it does not attack and gouge either the nozzle or the shield. The upper edge of the exit orifice is rounded to smooth the transition of the remaining gas flow 48a as it encounters and interacts with the plasma arc, and then flows downwardly out of the exit orifice 42.

Figure 1A:
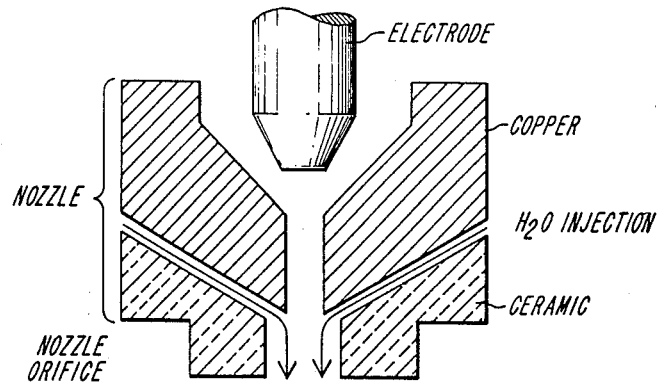
FIG. 1a is a simplified view in vertical cross section of a prior art electrode and multi-piece nozzle of a high-current, water-injection plasma arc torch.
Figure 1B:
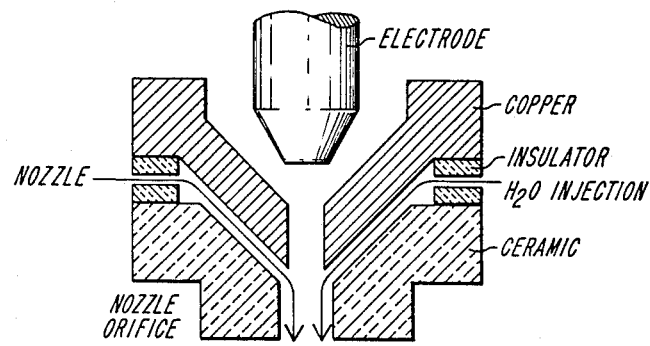
FIG. 1b is a view corresponding to FIG. 1a of an alternative prior art multi-piece, water-injection nozzle.
Figure 2A:
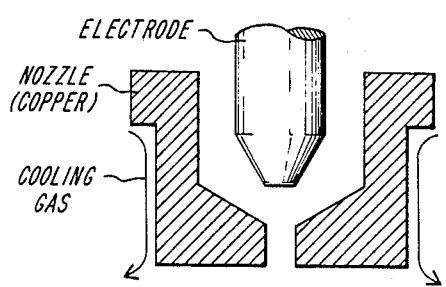
FIG. 2a is a simplified view in vertical section of a prior art one-piece, nozzle and electrode of a plasma arc torch for use with low currents.
Figure 2B:
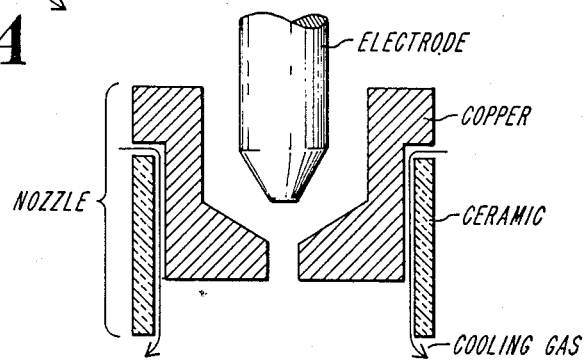
FIG. 2b is a view corresponding to FIG. 2a of an alternative prior art one-piece nozzle embodiment for low current use using a cylindrical ceramic shield.
Figure 4:
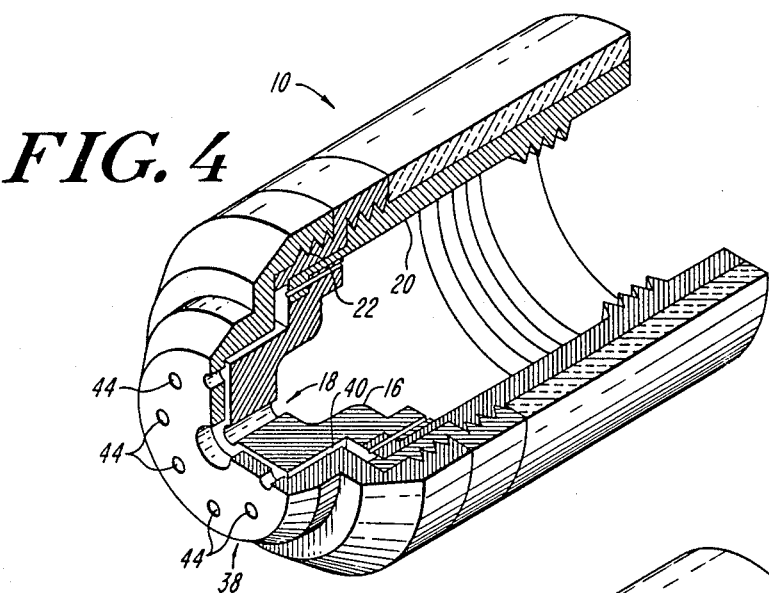
FIG. 4 is a view in perspective, with portions broken away, of the lower portion of the plasma arc torch shown in FIGS. 3a and 3b.
Figure 6:
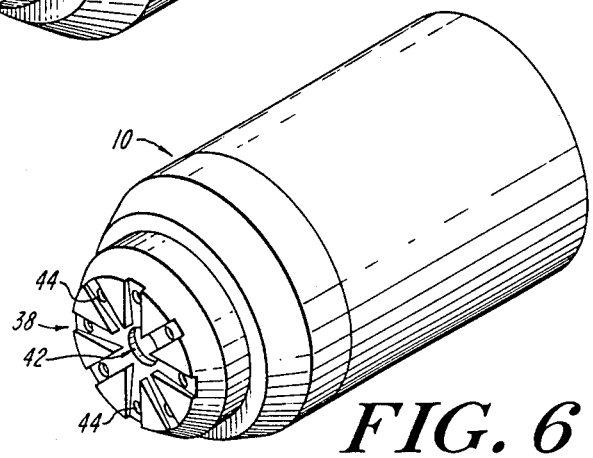
FIG. 6 is a view in perspective corresponding to FIG. 4, but showing an alternative shield configuration.

FIGS. 4–6 illustrate a commercial form of the torch 10 shown schematically in FIGS. 3a and 3b, like parts having the same reference numbers. In FIG. 4 the shield has a planar front face as shown in FIGS. 3a and 3b. In FIG. 5 the shield has a front face with radially directed recesses associated with each bleed hole 44. This arrangement reduces the likelihood of ejected molten metal attacking the nozzle by passing through one of the holes, or blocking the hole. FIG. 6 shows the lower end of the torch of FIG. 4 when it is assembled. The electrode, current leads and gas passages are not shown.

In operation, the torch is positioned over the workpiece 26 at a nozzle-to-workpiece standoff that is typically in the range of 0.100 to 0.200 inch. The precise distance varies with the current and other operating parameters, as is well known in the industry. To initiate the arc, the current path is in a pilot arc mode: current flows from the current lead 32 through the electrode 14, the nozzle 16, the cap 20, and the current ring 28 to the pilot arc lead 30. The current is in the range of 0–200 amperes, but can exceed 200 amperes. The torch is operated in this mode long enough to ionize the gap between the nozzle and the workpiece. When this ionization occurs, a pilot arc between the electrode and the nozzle transfers from the nozzle to the workpiece. A relay 56 is then opened on the pilot arc lead 30 so that the current path of the transferred arc is then from the current lead 32, through the elctrode 14 and to the workpiece 26 via the plasma arc 24.

During the arc ignition, there is a primary gas flow 58 through the tube 36 and plasma chamber 34. The flow preferably is swirling. The secondary gas flow 48 is also initiated. The ports 54 swirl the flow 48 which then proceed through the passage 40, with a portion of the flow being bled off through the holes 44. The secondary gas flow in the passage 40 cools the nozzle and the shield; the remaining gas flow 48a cools the front face 38c of the shield and stabilizes the plasma arc.

As the plasma arc heats the workpiece, it melts the metal and the molten metal 26a is ejected out of the developing "crater" at relatively high velocities as shown in FIG. 7. Initially the forming crater is relatively shallow and the molten metal is ejected wide of the shield 38. As the crater becomes deeper, the molten metal is ejected in an increasingly vertical trajectory. Because the shield has a high thermal conductivity, it can be cooled by the gas flow 48 to a degree that the molten metal does not attack the shield, and adherence is controlled. (While some metal may adhere, when the torch cools after a cut, tapping the shield will cause the metal to fall off.) Since the shield is insulated, no double arcing can occur as a result of a metal build up. In piercing thick workpieces (e.g. in excess of ½ inch), it is also desirable to translate the torch laterally during the piercing to reduce the opportunity for molten metal to be ejected directly vertically back into the nozzle orifice.

The precise gas flow rate and the dimensions of the various passages, orifices, ports and holes will vary in an interrelated manner and depending on the operating parameters. For example, a larger current will, in general, require a larger secondary gas flow rate to cool the torch and stabilize the arc. In particular, while the exit orifice should be large enough not to interfere with the egress of the plasma arc, it should also be sufficiently small that the remaining gas flow 48a interacts with the arc to provide the desired stabilization. Further, the secondary gas flow rate and velocity vary for each torch and with different operating conditions to produce a degree of swirling which results in the best possible cut. The precise values for a given torch and application are determined empirically. By way of illustration, but not of limitation, for a 100 ampere torch with a nozzle orifice diameter of 0.059 inch, the exit orifice is preferably about 0.170 inch.

There has been described a plasma arc cutting torch with an electrically neutral metallic nozzle shield operating in conjuncion with a secondary flow of cooling gas that protects the nozzle from gouging and double arcing due to molten metal ejected from the cut kerf. The torch does not utilize ceramics in locations where they can be readily damaged in normal usage. It also used conventional materials and fabrication techniques so that it provides these advantages at a favorable cost of manufacture. The nozzle protection system of the present invention also avoids the cost and power dissipation problems of water-injection torches so that nozzle life for torches operating in the 0–200 ampere current range can be extended dramatically.

While this invention has been described with respect to its preferred embodiments, it will be understood that various modifications and alterations will occur to those skilled in the art from the foregoing detailed description and drawings. For example, while the secondary gas flow is described as having an independent supply and delivery path from the main gas flow, it is possible to divert a portion of the main gas flow to create the secondary gas flow. Further, while the shield has been described as having a cup-like configuration, the invention is not limited to any one configuration for the shield, or any particular arrangement for mounting the shield, as long as the shield is effective in mechanically blocking the molten metal, can be cooled effectively with a gas flow, and preferably also produces a gas-plasma arc interaction that stabilizes the arc. These and other modifications and variations are intended to fall within the scope of the appended claims.

What is claimed is:

1. In a plasma arch torch for cutting and piercing a metal workpiece having a body, an electrode mounted within the body, a nozzle with an outlet orifice mounted on the body at one end thereof, means for introducing a primary gas flow passing through the body, between the electrode and the nozzle, and exiting through the nozzle outlet orifice, and means for directing an electrical current between said electrode and said nozzle to produce a plasma arc exiting the torch through said nozzle orifice, and impinging on said workpiece where it liquifies and splatters the molten metal, the improvement comprising, an electrically conductive shield mounted on said torch body, said shield generally surrounding said nozzle in a spaced relationship and having an exit orifice aligned with said nozzle orifice, said exit orifice being sufficiently large that it does not interfere with said arc, but being sufficiently small that substantially all of the splattered molten metal strikes the shield without reaching said nozzle and other components of said torch, means for insulating said shield electrically from said body to prevent double arcing, said shield being electrically floating, and means for producing a secondary gas flow through said body, said secondary gas flow passing through the space between said nozzle and said shield at a rate sufficient to cool the shield and a first portion of said secondary gas flow exiting said space through at least one bleed port formed in said shield and a second portion exiting through said shield exit orifice, said second portion being of a velocity that it stabilizes the plasma produced by said primary gas flow exiting said torch at said nozzle orifice and said shield exit orifice.

2. The improved plasma arc torch of claim 1 wherein said shield is formed of a material with a large thermal conductivity.

3. The improved plasma arc torch of claim 2 wherein said material is copper.

4. The improved plasma arc torch of claim 1 wherein said at least one opening comprises plural ports formed in a front face of said shield oriented transerve to said body.

5. The improved plasma arc torch of claim 1 wherein said secondary gas flow means includes means for swirling the gas flow.

6. The improved plasma arc torch of claim 5 wherein said gas swirling means comprises plural apertures in the flow path that are inclined to induce said swirling flow.

7. The improved plasma arc torch of claim 1 wherein said secondary gas flow rate, the dimensions of said at least one opening and the dimensions of said exit orifice are selected so that the secondary gas flow remaining after said bleeding off is sufficient (i) to cool the shield over the region between said opening and said exit orifice, (ii) to stabilize the plasma exiting said torch via said nozzle orifice and said exit orifice, and (iii) to block the path of splattered molten metal from the workpiece to the torch except for a substantially vertical path directly upward into the arc.

8. The improved plasma arc torch of claim 7 wherein said shield has a rounded edge at said exit orifice facing said nozzle.

9. The improved plasma arc torch of claim 5 further including a cap replaceably secured to said torch body, said cap mounting said insulating means and said shield at one end, and said cap having an inwardly directed flange that abuts said nozzle and wherein said gas flow swirling means includes a plurality of ports formed in said flange and angled to produce said swirling.

10. The improved plasma arc torch of claim 9 wherein said electrical insulating means comprises a ring of a dielectric material sandwiched between said cap and said shield.

11. The improved plasma arc torch of claim 1 wherein said means for producing a secondary gas flow creates a gas flow to said exit orifice that stabilizes the plasma produced by said primary gas flow exiting said torch at said nozzle orifice and said shield exit orifice.

12. The improved plasma arc torch of claim 11 wherein said shield has a rounded edge at said exit orifice facing said nozzle.

13. In the process of plasma arc cutting of a workpiece with a torch that produces a plasma of ionized gas between an electrode mounted within the torch and a nozzle mounted at one end of the torch adjacent the workpiece, the improvement comprising blocking molten material of said workpiece from said nozzle by placing a metallic shield between the nozzle and the workpiece that substantially encloses said nozzle except for an exit port for said plasma arc, isolating the shield electrically wherever electrical power is supplied to said electrode, and cooling the shield with a gas flow through a space between the nozzle and said shield, directing a first portion of the gas flow from the space through a set of ports formed in the shield, and directing a second portion of the gas flow to said plasma arc at a velocity that stabilizes said plasma arc.

14. The improved plasma arc cutting process of claim 13 wherein said blocking includes
   providing a copper shield, and
   spacing said shield from said nozzle.

15. The improved plasma arc cutting process of claim 11 wherein said cooling includes
   providing a secondary flow of cooling gas through said torch,
   bleeding off a portion of said secondary flow, and
   directing said remaining secondary gas flow at said plasma arc in the region between said nozzle and the point of said mechanical blocking to stablize the plasma arc.

16. The improved plasma arc cutting process of claims 13 or 15 further including the step of swirling said gas flow.

17. The improved plasma arc cutting process of claim 13 further improving the step of translating the torch laterally with respect to the workpiece.

* * * * *

REEXAMINATION CERTIFICATE (2954th)

United States Patent [19]
Sanders et al.

[11] B1 4,861,962
[45] Certificate Issued Jul. 16, 1996

[54] NOZZLE SHIELD FOR A PLASMA ARC TORCH

[75] Inventors: Nicholas A. Sanders, Norwich, Vt.; Richard W. Couch, Jr., Hanover, N.H.

[73] Assignee: Hypertherm, Inc., Hanover, N.H.

Reexamination Request:
No. 90/003,854, Jun. 8, 1995

Reexamination Certificate for:
Patent No.: 4,861,962
Issued: Aug. 29, 1989
Appl. No.: 203,440
Filed: Jun. 7, 1988

[51] Int. Cl.$^6$ .............. B23K 10/00; B23K 9/00
[52] U.S. Cl. .......... 219/121.5; 219/75; 219/121.51; 219/121.52
[58] Field of Search .............. 219/121.5, 121.39, 219/121.49, 121.51, 121.52, 74, 75, 121.48; 313/231.31, 231.41, 231.51; 315/111.21

[56] References Cited

U.S. PATENT DOCUMENTS

| | | |
|---|---|---|
| 2,906,858 | 9/1959 | Morton, Jr. . |
| 2,922,868 | 11/1960 | Hackman . |
| 3,004,189 | 10/1961 | Giannini . |
| 3,082,314 | 3/1963 | Arata et al. . |
| 3,106,631 | 10/1963 | Eschenbach . |
| 3,106,633 | 10/1963 | Skinner et al. . |
| 3,106,634 | 10/1963 | Eschenbach et al. . |
| 3,204,076 | 8/1965 | Browning . |
| 3,242,305 | 3/1966 | Kane et al. . |
| 3,272,962 | 9/1966 | Mauskapf ................ 219/137 |
| 3,534,388 | 10/1970 | Ito et al. . |
| 3,562,486 | 2/1971 | Hatch et al. . |
| 3,567,898 | 3/1971 | Fein . |
| 3,575,568 | 4/1971 | Tateno . |
| 3,641,308 | 2/1972 | Couch, Jr. et al. ........ 219/74 |
| 3,770,935 | 11/1973 | Tateno et al. . |
| 3,898,418 | 8/1975 | Hasui . |
| 3,949,188 | 4/1976 | Tateno . |
| 4,029,930 | 6/1977 | Sagara et al. . |
| 4,133,987 | 1/1979 | Lakomsky et al. . |
| 4,163,891 | 8/1979 | Komatsu et al. . |
| 4,174,477 | 11/1979 | Essers et al. . |
| 4,195,216 | 3/1980 | Beauchamp et al. . |
| 4,203,022 | 5/1980 | Couch, Jr. et al. . |
| 4,275,287 | 6/1981 | Hiratake . |
| 4,282,418 | 8/1981 | Wuestner . |
| 4,291,217 | 9/1981 | Braun . |
| 4,361,748 | 11/1982 | Couch, Jr. . |
| 4,382,170 | 5/1983 | Klingel . |
| 4,389,559 | 6/1983 | Rotolico ................ 219/121.5 |

(List continued on next page.)

FOREIGN PATENT DOCUMENTS

| | | |
|---|---|---|
| 1234104A | 11/1966 | European Pat. Off. . |
| 51-15795 | 10/1970 | Japan . |
| 51-16379 | 7/1973 | Japan . |
| 50-135721 | 4/1974 | Japan . |
| 52-36725 | 9/1975 | Japan . |
| 57-68270 | 10/1980 | Japan . |
| 57-165370 | 4/1982 | Japan . |
| 58-205676 | 11/1983 | Japan . |
| 64-9112 | 10/1984 | Japan . |
| 62-28084 | 7/1985 | Japan . |
| 63-30180 | 7/1986 | Japan . |
| 63-180378 | 1/1987 | Japan . |
| 63-10082 | 4/1987 | Japan . |
| 64-83376 | 8/1989 | Japan . |
| 188276 | 10/1966 | U.S.S.R. . |

*Primary Examiner*—Mark H. Paschall

[57] ABSTRACT

A plasma arc cutting torch, particularly one operating in the 0-200 ampere range, has a shield mounted at its lower end adjacent a workpiece to block splattered molten metal from reaching a nozzle of the torch. The shield is electrically insulated, preferably by mounting it on an insulating ring that is itself secured on a cap screwed onto the torch body. A secondary gas flow through the torch passes through the space between the nozzle and the shield to provide cooling. Bleed ports in the shield allow an enhanced flow rate with the remaining flow being at a rate, in conjunction with the size of an exit orifice in the shield, to stabilize the plasma arc. Canted ports in the secondary gas flow path produce a swirling of the gas flow which enhances the quality of the cut.

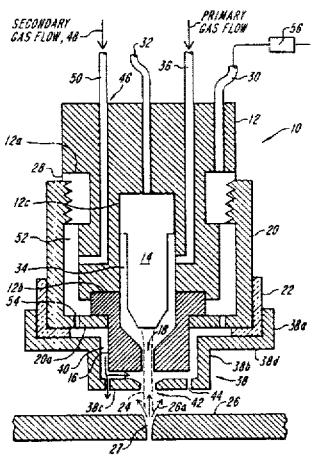

U.S. PATENT DOCUMENTS

| | | | |
|---|---|---|---|
| 4,421,970 | 12/1983 | Couch, Jr. | 219/121.5 |
| 4,521,666 | 6/1985 | Severance, Jr. et al. | 219/121.59 |
| 4,558,201 | 12/1985 | Hatch . | |
| 4,625,094 | 11/1986 | Marchic et al. . | |
| 4,626,648 | 12/1986 | Browning . | |
| 4,645,899 | 2/1987 | Bebber et al. . | |
| 4,701,590 | 10/1987 | Hatch . | |
| 4,743,734 | 5/1988 | Garlanov et al. . | |
| 4,762,977 | 8/1988 | Browning | 219/121.47 |
| 4,764,656 | 8/1988 | Browning . | |
| 4,777,343 | 10/1988 | Goodwin . | |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4–7, 9–11, 13 and 15 are determined to be patentable as amended.

Claims 2,3,8,12,14,16 and 17, dependent on an amended claim are determined to be patentable.

1. In a plasma arc torch for cutting and piercing a metal workpiece having a body, an electrode mounted within the body, a nozzle with an outlet orifice mounted on the body at one end thereof, means for introducing a primary gas flow passing through the body, between the electrode and the nozzle, and exiting through the nozzle orifice, and means for directing an electrical current between said electrode and said nozzle to produce a plasma arc exiting the torch through said nozzle orifice, and impinging on said workpiece where it liquefies and splatters the molten metal, the improvement comprising:

a shield mounted on said torch body, said shield generally surrounding said nozzle in a spaced relationship and having an exit orifice aligned with said nozzle orifice, said exit orifice being sufficiently large that it does not interfere with said arc, but being sufficiently small that substantially all of the splattered molten metal strikes the shield without reaching said nozzle and other components of said torch, means for inslulating said shield electrically from said *electrode nozzle and* body to prevent double arcing, said shield being electrically floating, and means for producing a secondary gas flow through said body, said secondary gas flow passing through the space between said nozzle and said shield at a rate sufficient to cool the shield, and a first portion of said secondary gas flow exiting said space through at least one bleed port formed in said shield and a second portion exiting through said shield exit orifice, said second portion being a [of] *a swirling flow having a* velocity that [it] stabilizes the plasma produced by said primary gas flow exiting said torch at said nozzle orifice and said shield exit orifice.

4. The improved plasma arc torch of claim 1 wherein said at least one [opening] *bleed port* comprises plural *bleed* ports formed in a front face of said shield oriented transverse to said body.

5. The improved plasma arc torch of claim 1 wherein said secondary gas flow means includes means for swirling the *secondary* gas flow *passing through the space between said nozzle and said shield.*

6. The improved plasma arc torch of claim 5 wherein said [gas] swirling means comprises plural apertures in the flow path that are inclined to induce said swirling flow.

7. The improved plasma arc torch of claim 1 wherein said secondary gas flow rate, the dimensions of said at least one [opening] *bleed port* and the dimensions of said exit orifice are selected so that the secondary gas flow remaining after said bleeding off is sufffficient (i) to cool the shield over the region between said opening and said exit orifice, (ii) to stabilize the plasma exiting said torch via said nozzle orifice and said exit orifice, and (iii) to block the path of splattered molten metal from the workpiece to the torch except for a substantially vertical path directly upward into the arc.

9. The improved plasma arc torch of claim 5 further including a cap replaceably secured to said torch body, said cap mounting said insulating means and said shield at one end, and said cap having an inwardly directed flange that abuts said nozzle and [wherein said gas flow swirling means includes] a plurality of ports formed in said flange and angled to produce said swirling.

10. The improved plasma arc torch of claim 9 wherein said [electrical] insulating means comprises a ring of a dielectric material sandwiched between said cap and said shield.

11. The improved plasma arc torch of claim 1 wherein said means for producing a secondary gas flow creates a *swirling* gas flow [to] *at* said exit orifice that stabilizes the plasma produced by said primary gas flow exiting said torch at said nozzle orifice and said shield exit orifice.

13. In the process of plasma arc cutting of a workpiece with a torch that produces a plasma of ionized gas between an electrode mounted within the torch and a nozzle mounted at one end of the torch adjacent the workpiece, the improvement comprising blocking molten material of said workpice from said nozzle by placing a metallic shield between the nozzle and the workpiece that substantially encloses said nozzle except for an exit port for said plasma arc, isolating the shield electrically [wherever electrical power is supplied to] *from* said electrode, *nozzle and torch body,* and cooling the shield with a gas flow through a space between the nozzle and said shield, directing a first portion of the gas flow from the space through a set of ports formed in the shield, and directing a second portion of the gas flow to said plasma arc [at], *said second portion being a swirling flow having* a velocity that stabilizes said plasma arc.

15. The improved plasma arc cutting process of claim [11] *13* wherein said cooling includes providing a secondary flow of cooling gas through said torch, bleeding off a *first* portion of said secondary flow, and directing said remaining *portion of said* secondary gas flow at said plasma arc in the region between said nozzle and the point of said mechanical blocking to stabilize the plasma arc.

* * * * *